(12) United States Patent
Zelley

(10) Patent No.: US 6,788,921 B1
(45) Date of Patent: Sep. 7, 2004

(54) MODULAR RF IC ARCHITECTURE

(75) Inventor: Christopher Andrew Zelley, Lowerwick (GB)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/538,578

(22) Filed: Mar. 29, 2000

(30) Foreign Application Priority Data

Apr. 1, 1999 (EP) .............................................. 99302632

(51) Int. Cl.⁷ .............................................. H04B 17/02
(52) U.S. Cl. ........................ 455/133; 455/140; 455/333
(58) Field of Search .......................... 455/140, 132–137, 455/272, 277.1–277.2, 279.1–280, 552.1, 553.1, 561, 562.1, 333

(56) References Cited

U.S. PATENT DOCUMENTS

| | | | |
|---|---|---|---|
| 3,743,941 A | 7/1973 | Gans | 325/305 |
| 5,640,694 A | * 6/1997 | Milton, Jr. | 455/133 |
| 5,648,985 A | 7/1997 | Bjerede et al. | 375/219 |
| 6,269,253 B1 | * 7/2001 | Maegawa et al. | 455/552 |

OTHER PUBLICATIONS

Titus, W., et al "A SI BJT RF Dual Band Receiver IC for DAB" IEEE Transactions on Microwave Theory And Techniques, Jun. 7, 1998 pp. 345–348.

European Search Report, Dated Aug. 30, 1999.

* cited by examiner

Primary Examiner—Lee Nguyen

(57) ABSTRACT

There is described an RF integrated circuit receiver structure. The structure comprises a receiver channel; a selectable amplification stage associated with the receiver channel; and a selectable diversity channel associated with the receiver channel. There is therefore provided a modular reconfigurable RFIC receiver architecture.

8 Claims, 3 Drawing Sheets

MODULAR RF IC ARCHITECTURE

CROSS-REFERENCE TO RELATED APPLICATION

This application claims priority of European Patent Application No. 99302632.7, which was filed on Apr. 1, 1999.

FIELD OF THE INVENTION

The present invention relates to an RF receiver on a single integrated circuit chip, and particularly but not exclusively to such a receiver for use in the base station of a mobile communications system.

BACKGROUND TO THE INVENTION

The analogue part of a mobile communications base station comprises radio frequency (RF) and IF circuitry. The RF circuitry is currently realised using discrete electronic components. In the interests of minimising circuit size and reducing costs, there is presently a drive toward the implementation of RF circuitry on integrated circuits (ICs).

The system architecture and RF IC requirements for different types of base station are significantly different, and this has led to the provision of integrated circuits implementing the RF circuitry for the different types of base station which can be used exclusively in the different types of applications.

For example, a base station for a macro-cellular mobile communications system requires a diversity channel, but may not necessarily require a low noise amplifier in the receiver channel. For a micro-cellular mobile communications system, a low noise amplifier and a diversity channel are usually required. For a pico-cellular system, neither a low noise amplifier nor a diversity channel is usually required.

Designing of RF IC receivers for all possible base station classes is thus costly and time consuming.

It is therefore an object of the present invention to provide an improved RF IC receiver.

SUMMARY OF THE INVENTION

According to the present invention there is provided an RF integrated circuit receiver structure comprising: a receiver channel; a selectable amplification stage associated with the receiver channel; and a selectable diversity channel associated with the receiver channel.

Thus there is proposed a general purpose, modular, radio frequency integrated circuit receiver architecture, which enables the system architecture to be configured differently around a single RF IC, to realise the functionality required for different base station applications.

For example, the amplification stage may be not selected, and the diversity channel may be selected, when the receiver channel is used in a base station of a macro-cellular mobile communications system.

In a further example the amplification stage may be selected and the diversity channel may be selected when the receiver channel is for use in a base station of a micro-cellular mobile communications system.

In a further example the amplification stage may not be selected and the diversity channel may not be selected when the receiver channel is for use in a base station of a pico-cellular mobile communications system.

The amplification stage is preferably a low noise amplifier.

The receiver channel may include a driver amplifier, a mixer, and an IF amplifier.

The elements of the receiver channel may be interconnected off-chip in accordance with the application of the receiver channel.

The diversity channel may comprise a driver amplifier, a mixer and an IF amplifier.

The elements of the diversity channel may be interconnected off-chip in accordance with the application of the receiver channel.

The invention will now be described by way of non-limiting example with reference to the attached drawings, in which:

DESCRIPTION OF PREFERRED EMBODIMENT

Figure 1:
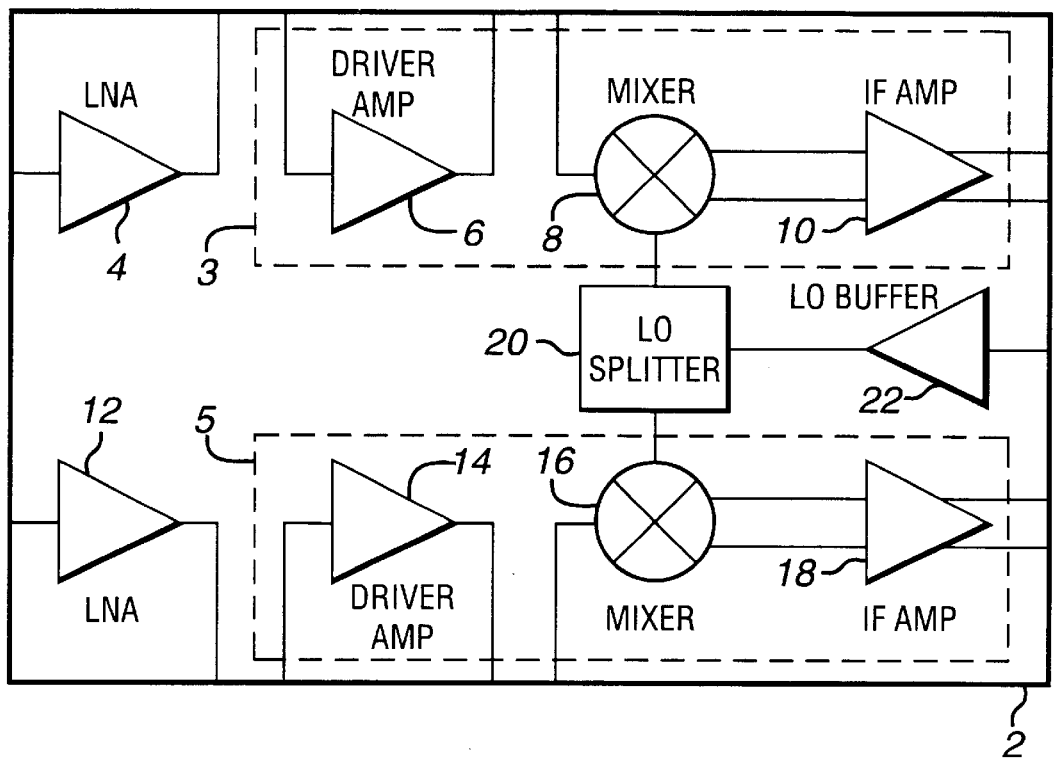
FIG. 1 illustrates an implementation of an RF IC according to an exemplary embodiment of the present invention.

FIG. 1 shows a schematic representation of a radio frequency (RF) integrated circuit (IC) 2 according to the present invention. The RF IC includes a receiver channel generally designated by reference numeral 3, a diversity channel generally designated by reference numeral 5, a low noise amplifier 14 associated with the receiver channel 3, and a low noise amplifier 12 associated with the diversity channel 5.

In this preferred implementation the receiver channel 3 includes a driver amplifier 6, a mixer 8, and an IF amplifier 10. The diversity channel 5 preferably includes a driver amplifier 14, a mixer 16 and an IF amplifier 18. However, it will be appreciated that the implementation of the receiver channel and diversity channel may vary beyond that shown in FIG. 1.

In the arrangement of FIG. 1 the output of the mixer 8 is connected to the input of the IF amplifier 10 on-chip. The interconnection of the other components of the receiver channel are determined by off-chip connections in accordance with the application of the RF IC. Also in the arrangement of FIG. 1 the output of the mixer 16 is connected to the input of the IF amplifier 18 on-chip. The interconnection of the other components of the diversity channel are similarly determined by off-chip connections in accordance with the application of the RF IC.

The RF IC in this preferred implementation also includes a local oscillator buffer 22 which is provided to receive a locally generated oscillator signal from off-chip. The output of the local oscillator buffer 22 forms an input to a local oscillator splitter 20, which in turn provides outputs to the two mixers 8 and 16. The inputs to the mixers 8 and 16 from the local oscillator splitter 20 provide the reference frequency for heterodyning the received signal. Although in the preferred implementation the RF IC includes the local oscillator buffer and local oscillator splitter, it will be appreciate that these components are not essential, and the reference inputs to the mixers may be provided directly from off-chip.

Figure 2:
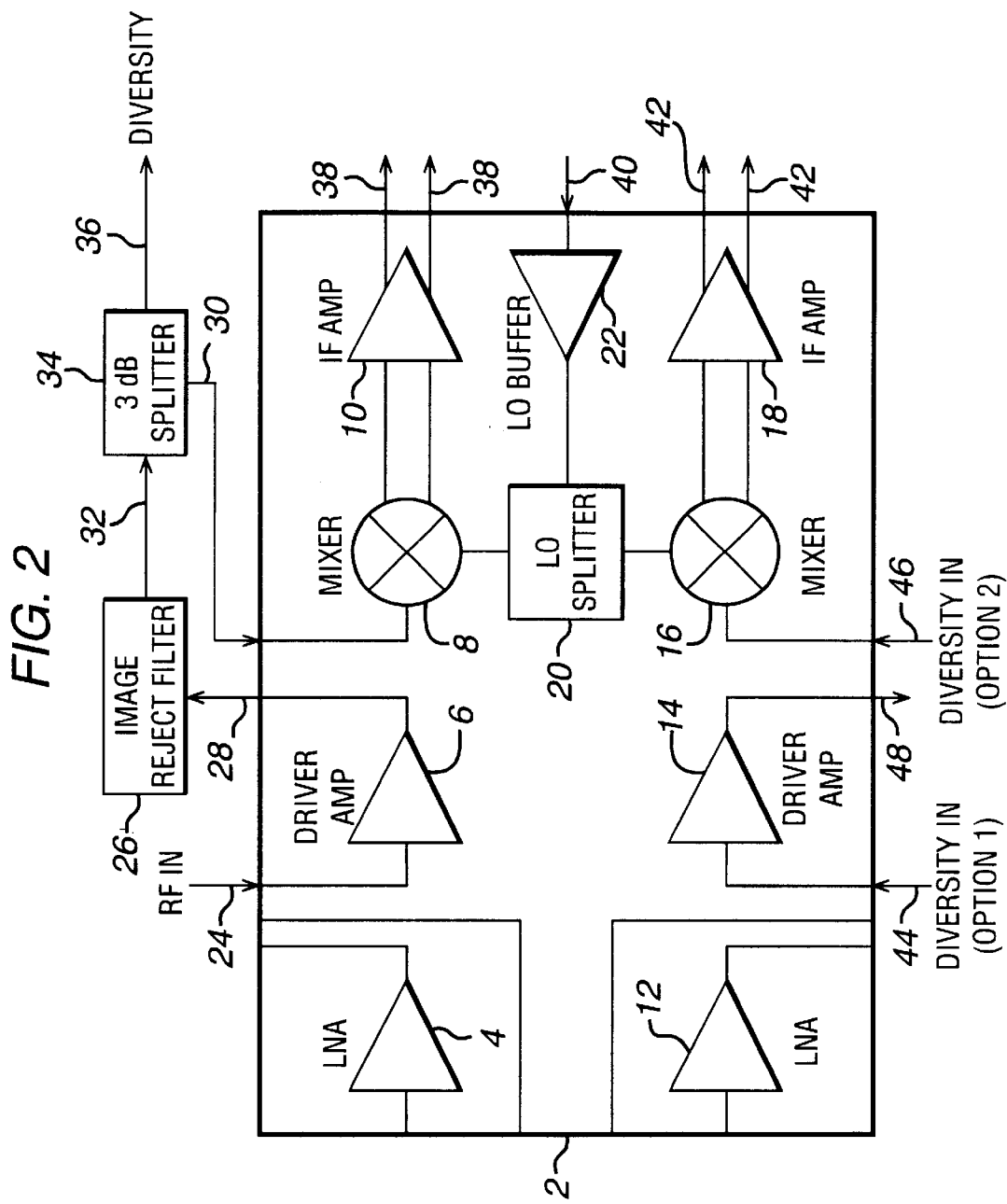
FIG. 2 illustrates the RF IC of FIG. 1 configured for use in a macro-cellular base station.

The low noise amplifiers 12 and 14 and the diversity channel 5 of FIG. 1 are selectively connected in combination with the receiver channel 3 by off-chip connections, such that in accordance with the invention, the RF IC of FIG. 1 can be used in a number of different applications. Three advantageous selections of the functionality provided by the RF IC 2 are discussed hereinbelow with reference to FIGS. 2 to 4, but it will be appreciated that the RF IC has applications beyond these three specific examples. Referring to FIG. 2, there is shown the selection of the diversity channel and low noise amplifier associated with the receiver channel when the RF IC is used as part of a receiver structure in the base station of a macro-cellular mobile communications structure. In the implementation of a macro-cellular base station considered herein, there is no requirement for a low noise amplifier in the receiver channel, since it is assumed that the implementation provides a low noise amplifier elsewhere in the system arrangement, for example in the antenna mast. The on-chip low noise amplifier is therefore not required and hence is not selected. It is envisaged that in alternative arrangements of a macrocellular system, the low-noise amplifier may not be provided elsewhere in the system and the on-chip low noise amplifier would therefore need to be used.

A diversity channel is required in the macro-cellular structure, and the diversity channel 5 is therefore selected. FIG. 2 also shows an example of the off-chip connections of the receiver channel and the diversity channel, and the interconnection of the essential components of the respective channels.

The driver amplifier 6 of the receiver channel receives the RF input signal from the receiver antenna on line 24 as its input. An off-chip image rejection filter 26 receives on its input line 28 the output of the driver amplifier 6. The output of the image rejection filter 26 on line 32 forms an input to a 3 dB splitter 34. The splitter 34 has two outputs on lines 30 and 36. The output on line 30 forms the off-chip input to the mixer 8. The output on line 36 forms the diversity output, as discussed further hereinbelow. The output of the receiver channel is provided on lines 38 from the RF IC.

The diversity input signal to the diversity channel 5 may be provided, in a preferable implementation, from a receiver or diversity channel off-chip tuned to a different frequency. Thus the RF IC 2 may be tuned to a first frequency and a second RF IC may be tuned to a second frequency. The second RF IC may receive an input signal on the main receiver channel 3 from a second antenna. The diversity output on line 36 of the first RF IC may be connected to one of the diversity inputs of the second RF IC, and the diversity output on the equivalent line 36 of the second RF IC may be connected to the one of the input lines 44 and 48 of the first RF IC. In such an arrangement the first RF IC tuned to the first frequency can select between the signals from the first and second antennas by selecting either the output of the receiver channel 3 on lines 38, or the output of the diversity channel on lines 42. Similarly the second RF IC tuned to the second frequency may select between the signals from the first and second antennas.

In an alternative arrangement the diversity input on either line 44 or 46 may be provided directly from a second antenna. In this arrangement the RF IC provides for selection between antennas by selection of one of the outputs on either lines 38 or 42. In this case both channels of the RF IC are tuned to the same frequency.

The RF input signal from the diversity antenna provides an input either on line 44 to the driver amplifier 14, or on line 46 to the mixer 48. If the driver amplifier is required, then the output of the driver amplifier on line 48 provides an input to the mixer on line 46. The output of the diversity channel is provided on lines 42 from the RF IC.

Figure 3:
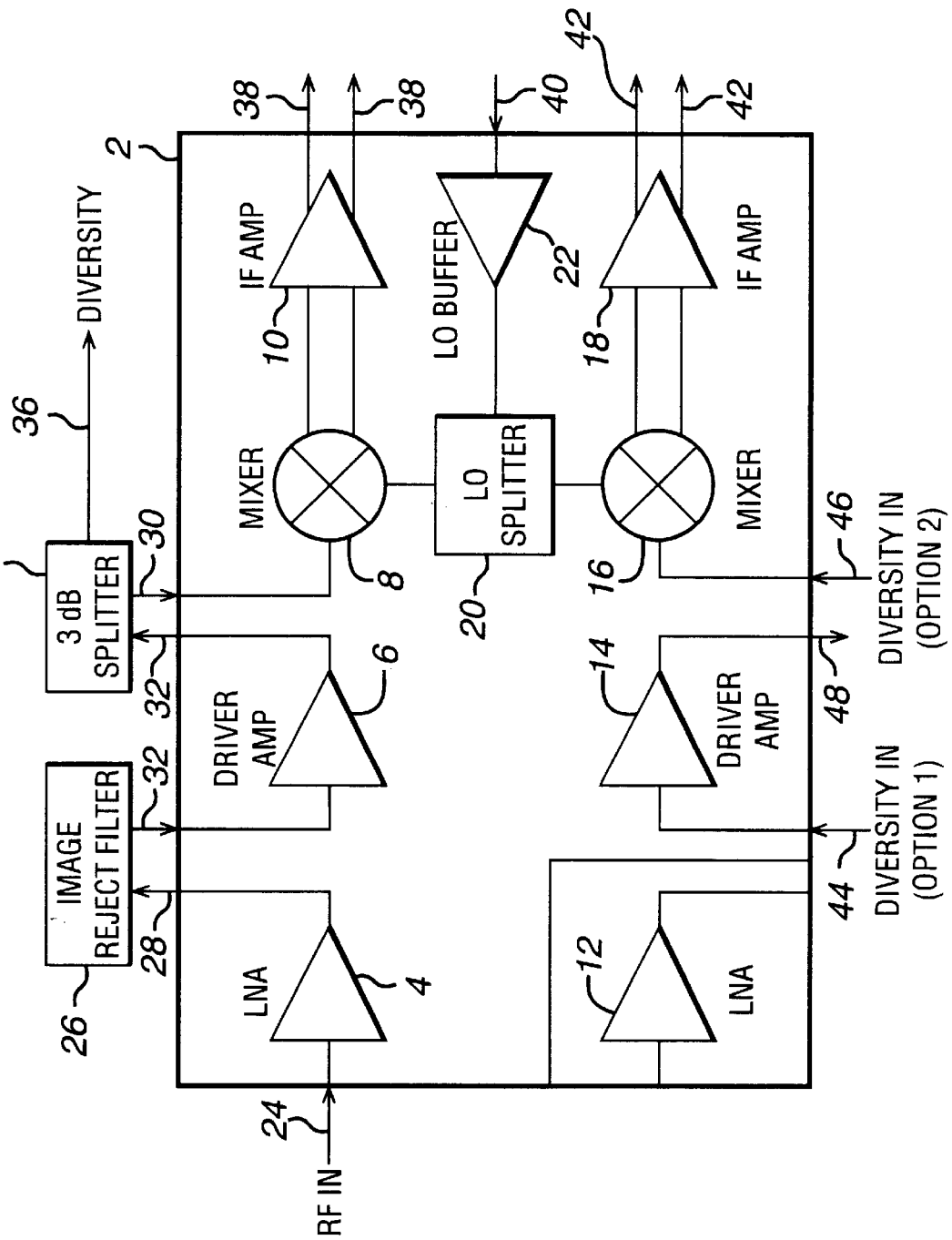
FIG. 3 illustrates the RF IC of FIG. 1 configured for use in a micro-cellular base station.

Referring to FIG. 3, there is shown the selection of the diversity channel and low noise amplifier associated with the receiver channel when the RF IC is used as part of a receiver structure in the base station of a micro-cellular mobile communications structure. In such an implementation, there is a requirement for a low noise amplifier in the receiver channel, and therefore the low noise amplifier is selected. A diversity channel is required, and the diversity channel 5 is therefore also selected. FIG. 3 also shows an example of the off-chip connections of the receiver channel and the diversity channel in this example implementation, and the interconnection of the essential components of the respective channels.

The low noise amplifier 4 receives the RF input signal from the receiver antenna on line 24 as its input. The off-chip image rejection filter 26 receives on its input line 28 the output of the low noise amplifier 4. The output of the image rejection filter 26 on line 32 forms an input to the driver amplifier 6. The output of the driver amplifier forms the input on line 32 to the 3dB splitter 34. The splitter 34 has two outputs on lines 30 and 36 as before. The output on line 30 forms the off-chip input to the mixer 8.

The output of the receiver channel is provided on lines 38 from the RF IC. Once again, the RF input signal from the diversity antenna provides an input either on line 44 to the driver amplifier 14, or on line 46 to the mixer 48. If the driver amplifier is required, then the output of the driver amplifier on line 48 provides the input to the mixer on line 46. The output of the diversity channel is provided on the lines 42 from the RF IC.

Figure 4:
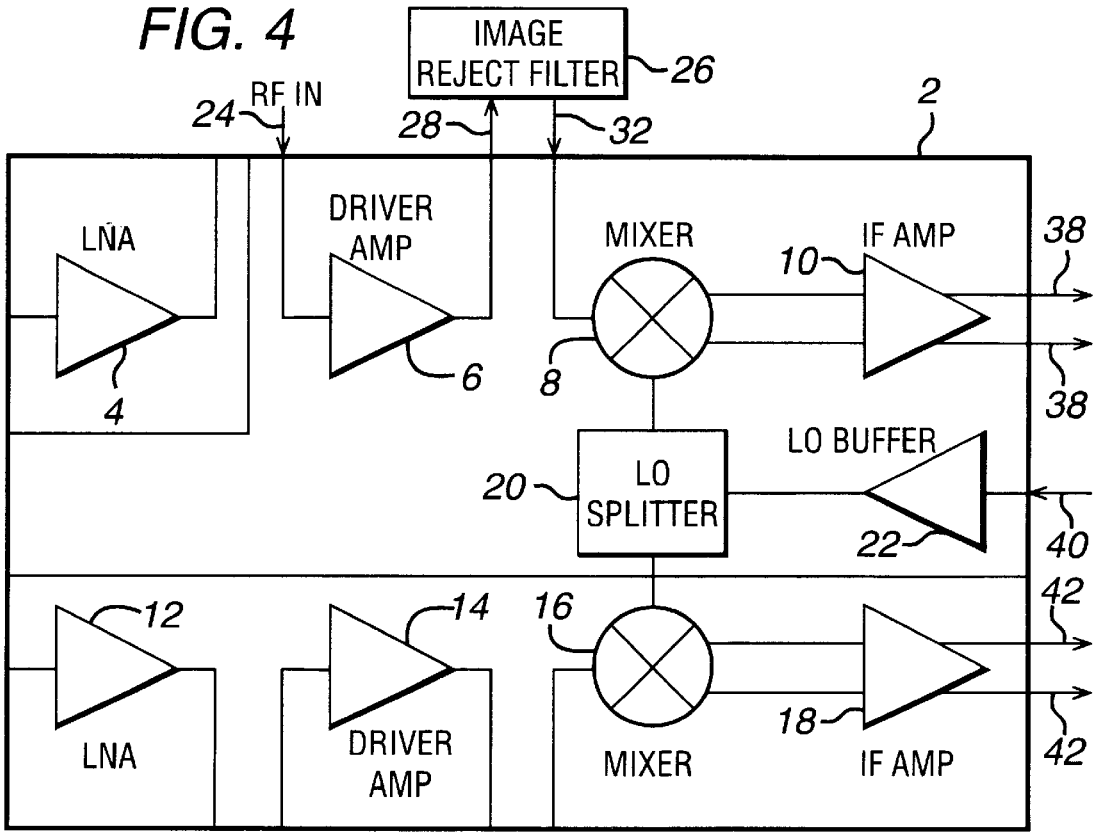
FIG. 4 illustrates the RF IC of FIG. 1 configured for use in a pico-cellular base station.

Referring to FIG. 4, there is shown the selection of the diversity channel and low noise amplifier associated with the receiver channel when the RF IC is used as part of a receiver structure in the base station of a pico-cellular mobile communications structure. In such an implementation, there is no requirement for a low noise amplifier in the receiver channel, and therefore the low noise amplifier is not selected. A diversity channel is also not required, and the diversity channel 5 is therefore also not selected. FIG. 4 also shows an example of the off-chip connections of the receiver channel, and the interconnection of the essential components of the receiver channel.

The driver amplifier 6 of the receiver channel receives the RF input signal from the receiver antenna on line 24 as its input. The off-chip image rejection filter 26 receives on its input line 28 the output of the driver amplifier 6. The output of the image rejection filter 26 on line 32 forms the off-chip input to the mixer 8. The output of the receiver channel is provided on lines 38 from the RF IC.

The low noise amplifier 12 is not used in any of the example implementations given above. However, its presence provides for extra flexibility and future system options. For example, the diversity channel 5 may be used as a receiver channel for a different antenna to that associated with the receiver channel 3, and the low noise amplifier 12 may form an input stage of such receiver channel. In such an arrangement the RF IC 2 provides two receiver channels at a common frequency, for two antennas.

The use of the general purpose, modular, base station receiver RF IC as described hereinabove provides a more comprehensive overall solution than current solutions allow, and gives base station system designers greater flexibility. The RF IC allows a single integrated circuit to meet the receiver requirements for three classes of base station, and has applications beyond.

Those elements of the RF IC not required for a particular application may be not selected by power not being supplied to them.

What is claimed is:

1. An RF integrated circuit receiver structure comprising: a receiver channel having a first input for receiving a signal from a first antenna and a second input for receiving a local oscillator signal at a reference frequency; a selectable amplification stage associated with the first input to the receiver channel; and a selectable diversity channel associated with the receiver channel, and having a first input for receiving a signal from a second antenna and a second input for receiving said local oscillator signal at said reference frequency.

2. The RF integrated circuit of claim 1 in which the amplification stage is a low noise amplifier.

3. The RF integrated circuit of claim 1, wherein the amplification stage is not selected and the diversity channel is selected when the receiver channel is for use in a base station of a macro-cellular mobile communications system.

4. The RF integrated circuit of claim 1, wherein the amplification stage is selected and the diversity channel is selected when the receiver channel is for use in a base station of a micro-cellular mobile communications system.

5. The RF integrated circuit of claim 1 in which the receiver channel includes a driver amplifier, a mixer and an IF amplifier.

6. The RF integrated circuit of claim 5 in which the elements of the receiver channel are interconnected off-chip in accordance with the application of the receiver channel.

7. The RF integrated circuit of claim 1 in which the diversity channel comprises a driver amplifier, a mixer and an IF amplifier.

8. The RF integrated circuit of claim 7 in which the elements of the diversity channel are interconnected off-chip in accordance with the application of the receiver channel.

* * * * *